(12) United States Patent
Muraoka

(10) Patent No.: US 10,627,936 B2
(45) Date of Patent: Apr. 21, 2020

(54) TOUCH PANEL AND DISPLAY DEVICE USING SAME

(71) Applicant: Panasonic Intellectual Property Management Co., Ltd., Osaka (JP)

(72) Inventor: Keisyu Muraoka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 108 days.

(21) Appl. No.: 15/735,969

(22) PCT Filed: Sep. 2, 2016

(86) PCT No.: PCT/JP2016/004015
§ 371 (c)(1),
(2) Date: Dec. 13, 2017

(87) PCT Pub. No.: WO2017/051507
PCT Pub. Date: Mar. 30, 2017

(65) Prior Publication Data
US 2018/0143719 A1    May 24, 2018

(30) Foreign Application Priority Data
Sep. 25, 2015   (JP) .................................. 2015-188174

(51) Int. Cl.
*G06F 3/041*       (2006.01)
*G06F 3/044*       (2006.01)
(Continued)

(52) U.S. Cl.
CPC .......... *G06F 3/0412* (2013.01); *G02F 1/1368* (2013.01); *G06F 3/044* (2013.01); *G06F 3/0416* (2013.01); *G02F 1/13338* (2013.01)

(58) Field of Classification Search
CPC ...... G06F 3/0412; G06F 3/0416; G06F 3/044; G02F 1/1368; G02F 1/13338
See application file for complete search history.

(56) References Cited

U.S. PATENT DOCUMENTS

| 2004/0119701 A1 | 6/2004 | Mulligan et al. |
| 2010/0033443 A1 | 2/2010 | Hashimoto |
| 2011/0090170 A1* | 4/2011 | Lin .................. G06F 3/044 345/174 |

FOREIGN PATENT DOCUMENTS

| JP | 2004-259640 | 9/2004 |
| JP | 2006-511879 | 4/2006 |

(Continued)

OTHER PUBLICATIONS

International Search Report of PCT application No. PCT/JP2016/004015 dated Nov. 1, 2016.

*Primary Examiner* — Aneeta Yodichkas
(74) *Attorney, Agent, or Firm* — McDermott Will & Emery LLP

(57) ABSTRACT

A touch panel includes a panel unit. The panel unit includes a base body, a conductor row, a first connection pad, a first wiring, and a second wiring. The first wiring includes a first line segment extending from the first connection pad toward a second end, and electrically connects a first conductor and the first connection pad to each other, on the base body. The second wiring includes a second line segment extending from the first connection pad toward a first end, a third line segment extending along the first end, and electrically connects the second conductor and the first connection pad to each other, on the base body.

16 Claims, 6 Drawing Sheets

(51) Int. Cl.
    *G02F 1/1368*    (2006.01)
    *G02F 1/1333*    (2006.01)

(56) References Cited

FOREIGN PATENT DOCUMENTS

| | | |
|---|---|---|
| JP | 2010-039816 | 2/2010 |
| JP | 3183453 U | 5/2013 |

\* cited by examiner

TOUCH PANEL AND DISPLAY DEVICE USING SAME

This application is a U.S. national stage application of the PCT International Application No. PCT/JP2016/004015 filed on Sep. 2, 2016, which claims the benefit of foreign priority of Japanese patent application 2015-188174 filed on Sep. 25, 2015, the contents all of which are incorporated herein by reference.

TECHNICAL FIELD

The present disclosure relates to a touch panel used for input to various electronic apparatuses, and a display device using the touch panel.

BACKGROUND ART

Hereinafter, a conventional touch panel is described. A conventional touch panel includes a panel unit and a connection unit. The panel unit includes a conductor group, a plurality of first connection pads, a plurality of first wirings, a linear conductor, a second connection pad, and a second wiring. These are provided on one surface of a base body. The plurality of first connection pads is aligned at one end portion side of the base body. The conductor group includes a plurality of conductors arranged in a first direction, and a plurality of conductors arranged in a direction orthogonal to the first direction. The plurality of conductors are connected to the plurality of first connection pads via the plurality of first wirings, respectively. The linear conductor is disposed along the plurality of conductors. The linear conductor is connected to the second connection pad via the second wiring. The second wiring is wired extending from the linear conductor toward one end portion of the base body.

The connection unit includes a first connection conductor, a second connection conductor, an input terminal, and an output terminal. These are formed on the base material. The first connection conductor is electrically connected to the first connection pad. The input terminal is electrically connected to the first connection conductor. A transmitted signal is input into the input terminal. The second connection conductor is electrically connected to the second connection pad. The output terminal is electrically connected to the second connection conductor. The output terminal outputs a received signal received by the linear conductor.

Note here that prior art literatures relating to this application include, for example, PTL 1.

CITATION LIST

Patent Literature

PTL 1: Japanese Patent Application Unexamined Publication No. 2010-39816

SUMMARY OF THE INVENTION

A touch panel includes a panel unit. The panel unit includes a base body, a conductor row, a first connection pad, a first wiring, and a second wiring.

The base body includes a first end, and a second end opposite the first end.

The conductor row includes a first conductor disposed on the base body, and a second conductor disposed in a first direction (X direction) with respect to the first conductor, on the base body.

A first connection pad is disposed between the conductor row and the first end of the base body, on the base body.

The first wiring includes a first line segment extending from the first connection pad toward the second end, and electrically connects the first conductor and the first connection pad to each other, on the base body.

The second wiring includes a second line segment extending from the first connection pad toward the first end of the base body, and a third line segment extending along the first end of the base body, and electrically connects the second conductor and the first connection pad to each other, on the base body.

A display device includes the touch panel mentioned above and a liquid crystal display device.

DESCRIPTION OF EMBODIMENTS

Prior to description of a touch panel of an exemplary embodiment, a display device using a touch panel is described. A display device includes a touch panel and a liquid crystal display device (LCDD). The display device is configured by disposing the touch panel above the liquid crystal display device. The liquid crystal display device and the touch panel are formed of individual units, respectively. This is a so-called out-cell type display device.

Recently, such a display device is installed in, for example, portable information terminals such as a smartphone or a tablet terminal. These portable information terminals are required to be small and light, that is, to have portability. Therefore, a display device is also required to be small and light. Accordingly, in addition to a conventional out-cell type display device, for example, on-cell type or in-cell type display devices have been developed.

However, in a conventional touch panel, a first connection pad is connected to each conductor. Accordingly, the same number of the first connection pads as the conductors are required. Therefore, a region in which a connection pad group is disposed is increased. Furthermore, in the connection unit, the number of the first connection conductors to be connected to the first connection pads are also increased. Consequently, the size of the connection unit is increased. As a result, a large area other than an area for the conductor group or the linear conductor is required. Consequently, a size of the touch panel is increased.

Hereinafter, a touch panel in accordance with an exemplary embodiment is described.

FIRST EXEMPLARY EMBODIMENT

Figure 1:
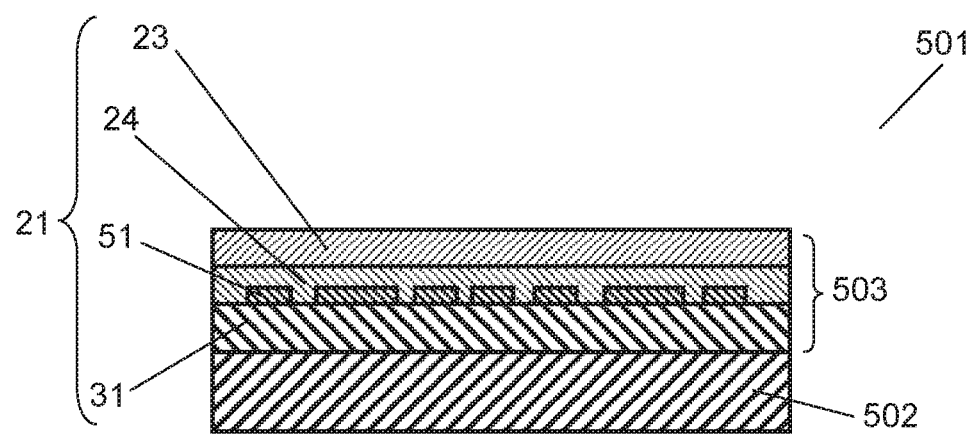
FIG. 1 is a sectional view of a display device in accordance with an exemplary embodiment.
Figure 2:
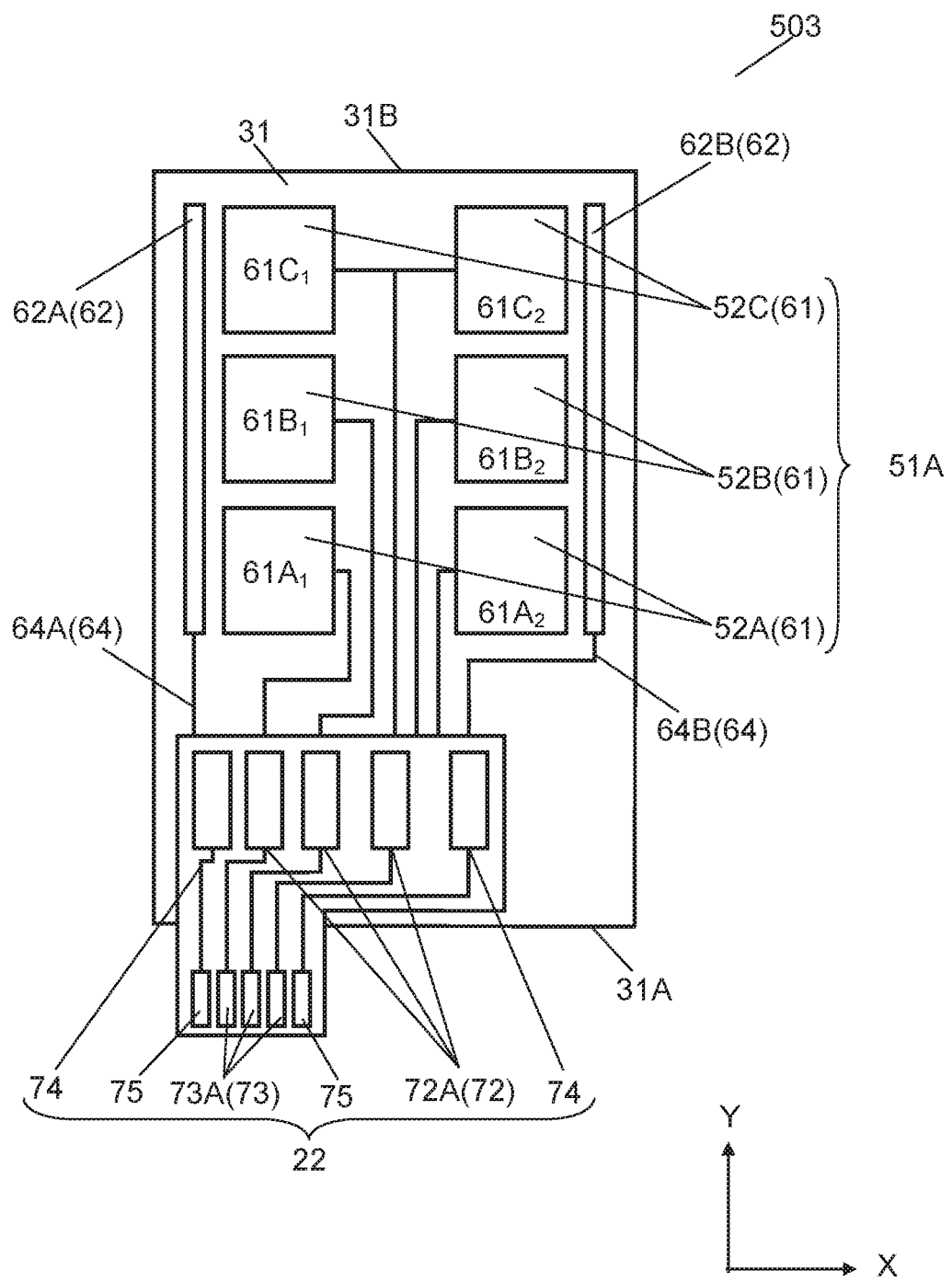
FIG. 2 is a front view of a touch panel in accordance with the exemplary embodiment.
Figure 3:
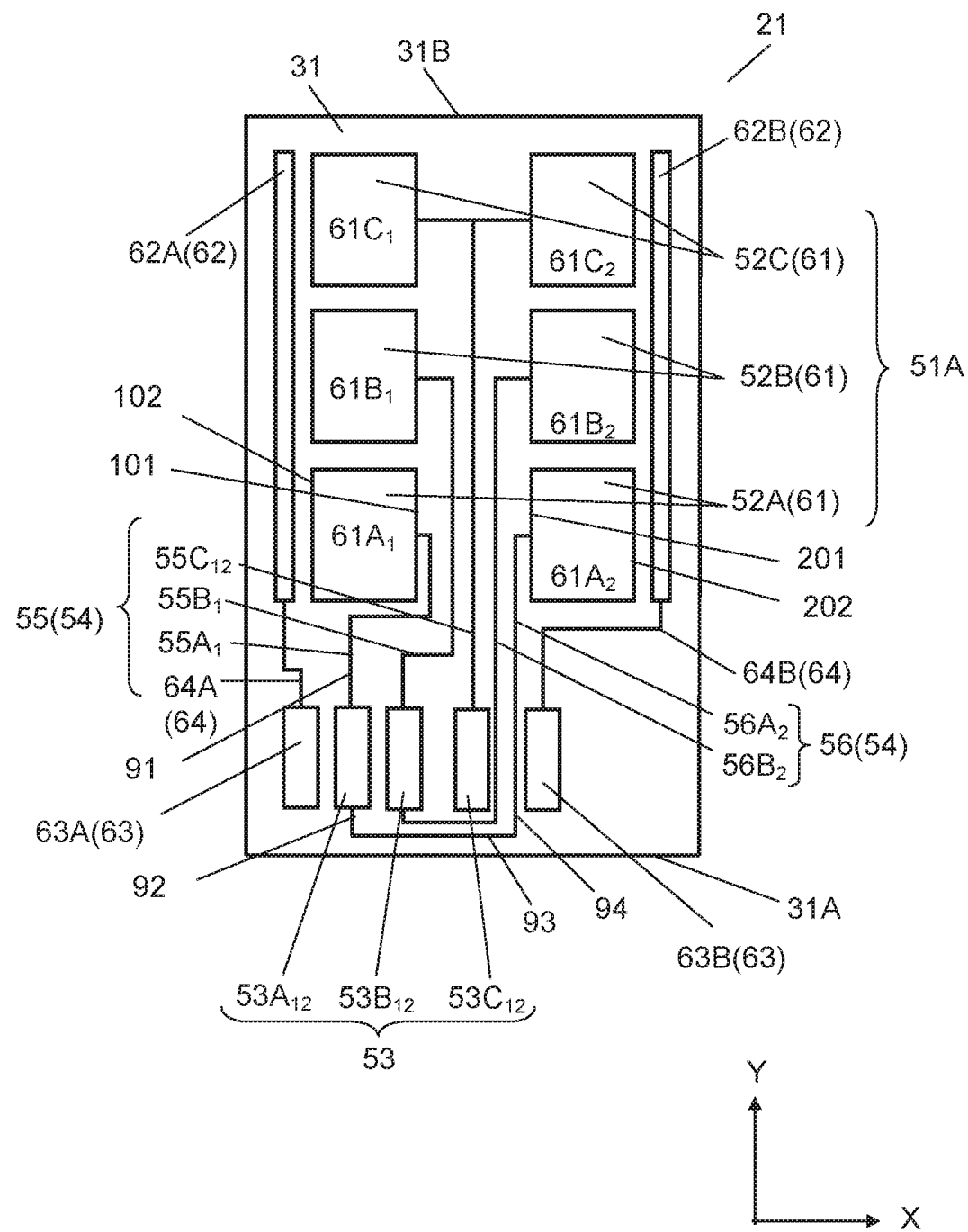
FIG. 3 is a front view of a panel unit in accordance with the exemplary embodiment.
Figure 4:
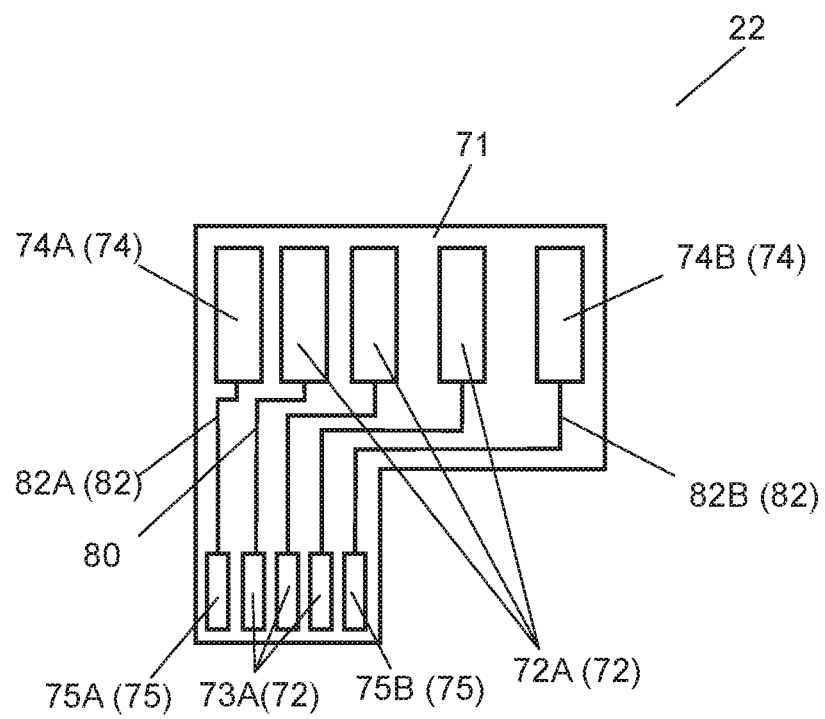
FIG. 4 is a front view of a connection unit in accordance with the exemplary embodiment.

FIG. 1 is a sectional view of display device 501 in accordance with an exemplary embodiment. FIG. 2 is a front view of touch panel 503 in accordance with the exemplary embodiment. FIG. 3 is a front view of panel unit 21 in accordance with the exemplary embodiment. FIG. 4 is a front view of connection unit 22 in accordance with the exemplary embodiment.

Touch panel 503 includes panel unit 21. Panel unit 21 includes base body 31, conductor row 52A, connection pad $53A_{12}$ (first connection pad), wiring $55A_1$ (first wiring), and wiring $56A_2$ (second wiring).

Base body 31 includes first end 31A, and second end 31B opposite to first end 31A.

Conductor row 52A includes conductor $61A_1$ (first conductor) disposed on base body 31, and conductor $61A_2$ (second conductor) disposed in a first direction (X direction) with respect to conductor $61A_1$, on base body 31.

Connection pad $53A_{12}$ is disposed between conductor row 52A and first end 31A of base body 31 on base body 31.

Wiring $55A_1$ has line segment 91 (first line segment) extending from connection pad $53A_{12}$ toward second end 31B, and electrically connects conductor $61A_1$ and connection pad $53A_{12}$ to each other, on base body 31.

Wiring $56A_2$ has line segment 92 (second line segment) extending from connection pad $53A_{12}$ toward first end 31A, and line segment 93 (third line segment) extending along first end 31A of base body 31, and electrically connects conductor $61A_2$ and connection pad $53A_{12}$ to each other, on base body 31.

Wiring $56A_2$ may include line segment 94 (fourth line segment) extending from first end 31A toward second end 31B.

Herein, the first direction (X direction) is a direction perpendicular to the shortest distance linking first end 31A and second end 31B of base body 31.

That is to say, the first direction (X direction) is defined as a short axis direction of base body 31, and the second direction (Y direction) is defined as a direction perpendicular to the X direction, namely, the long axis direction of base body 31. However, the first direction (X direction) and the second direction (Y direction) are not limited to these directions.

Hereinafter, out-cell type display device 501 using touch panel 503 is described in detail. Display device 501 includes liquid crystal display device 502 and touch panel 503. In out-cell type display device 501, touch panel 503 is installed at a light emitting surface side of liquid crystal display device 502.

Touch panel 503 includes panel unit 21 and connection unit 22. Panel unit 21 includes base body 31, sensor conductor 51, and a plurality of connection pads 53. Base body 31 includes first end 31A, and second end 31B opposite to first end 31A. Sensor conductor 51 is provided on one surface of base body 31. Sensor conductor 51 includes conductor group 51A and wiring group 54. Conductor group 51A includes a plurality of conductors 61. Wiring group 54 includes a plurality of wirings 55 and a plurality of wirings 56. The plurality of conductors 61 and the plurality of connection pads 53 are connected to each other with the plurality of wirings 55 and 56.

Connection unit 22 includes base material 71, a plurality of connection conductors 72A (first connection conductors), and a plurality of terminals 73A (first terminals). The plurality of connection conductors 72A are generically called connection conductor row 72. The plurality of terminals 73A are generically called terminal row 73. Connection conductor row 72 and terminal row 73 are provided on the base material. The plurality of connection conductors 72A and the plurality of terminals 73A are connected to each other by connection wirings 80 (first connection wirings), respectively. A transmitted signal is input into the plurality of terminals 73A. Note here that connection conductors 72A are disposed corresponding to connection pads 53, respectively. Connection conductors 72A are electrically connected to connection pads 53, respectively. Note here that connection conductors 72A and connection pads 53 may be connected to each other by, for example, pressure bonding, and the like.

Conductor group 51A includes conductor row 52A, conductor row 52B, and conductor row 52C. For example, conductor row 52A includes conductor $61A_1$ and conductor $61A_2$ which are arranged in the first direction (X-axis direction). Conductor row 52B includes conductor $61B_1$ and conductor $61B_2$ which are arranged in the first direction. Conductor row 52C includes conductor $61C_1$ and conductor $61C_2$ which are arranged in the first direction. Conductor row 52B is arranged in the second direction (Y-axis direction) with respect to conductor row 52A. That is to say, conductor row 52B is disposed at a second end 31B side of conductor row 52A. Conductor group 51A is configured by arranging a plurality of conductors 61 in the X-axis direction and the Y-axis direction orthogonal to each other.

Connection pads 53 are disposed between conductor row 52A and first end 31A. Furthermore, each connection pad 53 is electrically connected to two conductors 61 in conductor row 52A. Note here that connection pad 53 may not necessarily be connected to two conductors 61 in conductor row 52A, may be connected to two conductors 61 in conductor row 52B, and may be connected to two conductors 61 in conductor row 52C.

Wirings 55 and 56 are connected to connection pads 53, respectively. Wiring 55 is connected to, for example, any one of conductors 61 (for example, conductor $61A_1$) of conductor row 52A. On the other hand, wiring 56 is connected to conductor 61 (for example, conductor $61A_2$) that is not connected to wiring 55 in conductor row 52A. Note here that wiring 55 may not necessarily be connected to any one of conductors 61 in conductor row 52A, and may be connected to any one of conductors 61 (for example, conductor $61B_1$) in conductor row 52B. In this case, wiring 56 is connected to conductor 61 (for example, conductor $61B_2$) that is not connected to wiring 55 in conductor row 52B. Furthermore, wiring 55 may be connected to any one of conductors 61 (for example, conductor $61C_1$) in conductor row 52C. In this case, wiring 56 is connected to conductor 61 (for example, conductor $61C_2$) that is not connected to wiring 55 in conductor row 52C.

In the above-mentioned configuration, wiring 55 extends from connection pad 53 toward second end 31B. On the other hand, wiring 56 extends from connection pad 53 toward first end 31A, and then extends along first end 31A. That is to say, wiring 56 is wired along first end 31A from the end point at which wiring 56 extends from connection pad 53 toward first end 31A. Furthermore, wiring 56 extends toward second end 31B from the end point at which wiring 56 is wired along first end 31A.

As mentioned above, wiring 55 and wiring 56 extend in the opposite directions to each other with respect to connection pad 53. Wiring 56 passes between connection pad 53 and first end 31A. Thus, any wirings in wiring 56 can be configured so as not to cross other wiring. Therefore, a plurality of conductors 61 can be connected to one connection pad 53. As a result, the number of connection pads 53 can be reduced. Therefore, an area of a region in which connection pad 53 is disposed can be reduced, thus reducing a size of panel unit 21. In addition, the number of connection conductors 72A in connection unit 22 can be reduced.

Therefore, an area of a region in which connection conductor row 72 is wired can be reduced. Consequently, connection unit 22 can be reduced in size. With the above-mentioned configuration, a size of touch panel 503 can be reduced.

Hereinafter, a configuration of touch panel 503 is described in more detail with reference to FIG. 1. It is preferable that base body 31 is made of a material having high optical transparency. For example, as base body 31, glass is used. Note here that base body 31 is not necessarily limited to glass, and may be resin. In this case, examples of the base material include polyethylene terephthalate (PET), polycarbonate (PC), and the like.

Panel unit 21 may further include cover lens 23 (see FIG. 1). Cover lens 23 is preferably made of a material having high optical transparency. Furthermore, in order to suppress generation of flaws, cover lens 23 is preferably made of hard material. For example, as cover lens 23, glass is used. Note here that cover lens 23 is not necessarily limited to glass and may be resin.

Adhesive layer 24 is provided between cover lens 23 and base body 31, and joins cover lens 23 and base body 31 to each other (see FIG. 1). Base body 31 is attached to cover lens 23 such that sensor conductors 51 face cover lens 23. In this case, base body 31 is disposed so as to face liquid crystal display device 502.

It is preferable that adhesive layer 24 is not formed at least on connection pad 53. In this case, connection pad 53 shown in FIG. 3 is exposed from adhesive layer 24. Note here that adhesive layer 24 may also be provided between connection unit 22 and cover lens 23.

Cover lens 23 is preferably disposed so as to cover connection pad 53. With this configuration, it is possible to reduce stress applied on a connection portion between connection unit 22 and connection pad 53. In this case, adhesive layer 24 is preferably provided also between connection unit 22 and cover lens 23. This configuration makes it possible to further reduce stress applied on a connection portion between connection unit 22 and connection pad 53. Note here that cover lens 23 is not necessarily limited to have a configuration of covering connection pad 53, and cover lens 23 may not be formed on connection pad 53.

Touch panel 503 may include a display region (not shown) and a decorative region (not shown). Note here that the decorative region is formed outside the display region so as to surround the display region. Furthermore, the decorative region is formed on the outer periphery of touch panel 503. That is to say, the decorative region may be formed on the outer peripheral edge of base body 31. Note here that the decorative region can be configured by forming a layer of a material having low optical transparency on the surface of base body 31 or cover lens 23.

Conductor group 51A and wiring group 54 are preferably formed of a material having excellent optical transparency. In addition, conductor group 51A and wiring group 54 in at least the display region are preferably made of material having excellent optical transparency. However, conductor group 51A and wiring group 54 are required to have electric conductivity. Thus, conductor group 51A and wiring group 54 can be formed of, for example, an ITO (indium thin oxide) film. Alternatively, conductor group 51A and wiring group 54 may not be necessarily formed of an ITO film, and may be formed of a metal mesh. In this case, the metal mesh can be formed of, for example, a material such as copper or a copper alloy.

Note here that entire wiring group 54 may not be formed of a material having excellent optical transparency. For example, a part of wiring group 54 may be formed of a material having lower optical transparency than conductor group 51A.

In general, the decorative region is formed of a decorative layer (not shown) formed on base body 31. The transmittance of the decorative layer is smaller than that of base body 31. In general, the decorative layer is black. Note here that the decorative layer is formed on a surface opposite to a surface provided with sensor conductor 51 and connection pad 53 on base body 31. In such a case, wiring group 54 in the decorative region may be made of a material having lower optical transparency as compared with conductor group 51A. Furthermore, connection pad 53 and connection pad 63 may be made of a material having lower optical transparency than conductor group 51A. In this case, also when a material having lower optical transmittance is used for wiring group 54 and connection pad 53, it is possible to suppress visible recognition by an operator of connection pad 53 and wiring 54 of the decorative region. Therefore, wiring group 54, connection pad 53 and connection pad 63 in the decorative region may be formed of material such as copper, or a copper alloy.

Next, an example of conductor group 51A and connection pad 53 is described with reference to drawings. As shown in FIG. 2, conductor group 51A includes conductor row 52A, conductor row 52B, and conductor row 52C. Conductor row 52A is composed of, for example, conductor $61A_1$, and conductor $61A_2$. Conductor row 52B is composed of, for example, conductor $61B_1$, and conductor $61B_2$. Conductor row 52C is composed of, for example, conductor $61C_1$ and conductor $61C_2$. Conductor row 52A is disposed at the nearest position to first end 31A in conductor group 51A. Conductor row 52C is disposed at the nearest position to second end 31B in conductor group 51A. Conductor row 52B is disposed between conductor row 52A and conductor row 52C in conductor group 51A.

In this configuration, conductor $61A_2$ is arranged in the X-axis direction with respect to conductor $61A_1$. Conductor $61B_2$ is arranged in the X-axis direction with respect to conductor $61B_1$. Conductor $61C_2$ is arranged in the X-axis direction with respect to conductor $61C_1$. Conductor $61B_1$ is arranged in the Y-axis direction with respect to conductor $61A_1$. Conductor $61C_1$ is arranged in the Y-axis direction with respect to conductor $61B_1$.

Note here that conductor $61A_2$ is disposed adjacent to conductor $61A_1$, but the configuration is not necessarily limited to this. The other conductor 61 may be disposed between conductor $61A_1$ and conductor $61A_2$. Furthermore, conductor $61B_1$ is disposed adjacent to conductor $61B_2$, but the configuration is not necessarily limited to this. The other conductor 61 may be disposed between conductor $61B_1$ and conductor $61B_2$. Furthermore, conductor row 52B is adjacent to conductor row 52A and conductor row 52C. However, the configuration is not necessarily limited to this, and the other conductor row (not shown) may be disposed between conductor row 52B and conductor row 52A, or between conductor row 52B and conductor row 52C.

Connection pad 53 includes connection pad $53A_{12}$, connection pad $53B_{12}$, and connection pad $53C_{12}$ (see FIG. 3). Connection pad $53A_{12}$ is connected to conductor $61A_1$ and conductor $61A_2$. Connection pad $53B_{12}$ is connected to conductor $61B_1$ and conductor $61B_2$. Connection pad $53C_{12}$ is connected to conductor $61C_1$ and conductor $61C_2$. Furthermore, wiring 55 includes wiring $55A_1$, wiring $55B_1$, and wiring $55C_{12}$. Wiring 56 includes wiring $56A_2$ and wiring $56B_2$.

Wiring $55A_1$ connects conductor $61A_1$ and connection pad $53A_{12}$ to each other. Wiring $55B_1$ connects conductor $61B_1$ and connection pad $53B_{12}$ to each other. On the other hand, wiring $56A_2$ connects conductor $61A_2$ and connection pad $53A_{12}$ to each other. Wiring $56B_2$ connects conductor $61B_2$ and connection pad $53B_{12}$ to each other. Wiring $55C_{12}$ is connected to conductor $61C_1$, conductor $61C_2$, and connection pad $53C_{12}$.

In the above-mentioned configuration, wiring $55A_1$, wiring $55B_1$, and wiring $55C_{12}$ are wired from connection pad 53 toward second end 31B. Wiring $56A_2$ and wiring $56B_2$ extend from connection pad 53 toward first end 31A. Then, wiring $56A_2$ and wiring $56B_2$ are wired so as to extend along first end 31A from an end portion at which wiring $56A_2$ and wiring $56B_2$ extend from connection pad 53 toward first end 31A. Furthermore, wiring $56A_2$ and wiring $56B_2$ are wired from an end portion wired along first end 31A toward second end 31B.

Note here that a configuration is not limited to a configuration in which only connection pad 53 is electrically connected to connection conductor 72A. The end portion of wiring 56 and connection conductor 72A may be electrically connected in the vicinity of connection pad 53. Furthermore, wiring 56 is wired along first end 31A from the end portion at which wiring 56 extends from connection pad 53 toward first end 31A. However, wiring 56 is not limited to this configuration. For example, wiring 56 may be wired along first end 31A from the end portion of connection pad 53. In this case, connection pad $53A_{12}$ is preferably longer than connection pad $53B_{12}$. Furthermore, the end portion at a first end 31A side of connection pad $53A_{12}$ may be disposed nearer to first end 31A than the end portion at the first end 31A side of connection pad $53B_{12}$.

That is to say, panel unit 21 may include a line segment (fifth line segment) extending from connection pad $53A_{12}$ along first end 31A of base body 31, and a line segment (sixth line segment) extending from first end 31A toward second end 31B, and may include second wiring $56A_2$ electrically connecting conductor $61A_2$ and connection pad $53A_{12}$ to each other.

Sensor conductor 51 may include linear conductor 62, connection pad 63, and wiring 64. Linear conductor 62 is preferably formed linearly from first end 31A toward second end 31B. In this case, linear conductor 62 is wired in the Y-axis direction. Furthermore, linear conductor 62 preferably includes linear conductor 62A and linear conductor 62B. Furthermore, wiring 64 includes wiring 64A and wiring 64B. Connection pad 63 includes connection pad 63A and connection pad 63B. Wiring 64A electrically connects linear conductor 62A and connection pad 63A to each other. Wiring 64B electrically connects linear conductor 62B and connection pad 63B to each other. In this case, linear conductor 62A is disposed along one end of each of conductor $61A_1$, conductor $61B_1$, and conductor $61C_1$. On the other hand, linear conductor 62B is disposed along one end of each of conductor $61A_2$, conductor $61B_2$, and conductor $61C_2$.

That is to say, when a surface of conductor $61A_1$ (first conductor) facing conductor $61A_2$ (second conductor) is first surface 101 of conductor $61A_1$, and a surface opposite to first surface 101 is second surface 102 of conductor $61A_1$, panel unit 21 is configured as follows. Panel unit 21 includes linear conductor 62A (first linear conductor) disposed at a position facing second surface 102 of conductor $61A_1$, connection pad 63A (second connection pad) disposed between linear conductor 62A and first end 31A of base body 31, and wiring 64A (third wiring) electrically connecting linear conductor 62A and connection pad 63A to each other.

Furthermore, when a surface of conductor $61A_2$ (second conductor) facing conductor $61A_1$ (first conductor) is first surface 201 of conductor $61A_2$, and a surface opposite to first surface 201 is second surface 202 of conductor $61A_2$, panel unit 21 is configured as follows. Panel unit 21 includes linear conductor 62B (second linear conductor) disposed at a position facing second surface 202 of conductor $61A_2$, connection pad 63B (third connection pad) disposed between linear conductor 62B and first end 31A of base body 31, and wiring 64B (fourth wiring) electrically connecting linear conductor 62B and connection pad 63B to each other.

Connection unit 22 further includes connection conductor 74A (second connection conductor) and terminal 75A (second terminal) on base material 71. Terminal 75A and connection conductor 74A are electrically connected to each other by connection wiring 82A (second connection wiring). Connection conductor 74A is electrically connected to connection pad 63A. Note here that connection conductor 74A can be connected to connection pad 63A by, for example, pressure bonding.

Furthermore, connection unit 22 further includes connection conductor 74B (third connection conductor) and terminal 75B (third terminal) on base material 71. Terminal 75B and connection conductor 74B are electrically connected to each other by connection wiring 82B (third connection wiring). Connection conductor 74B is electrically connected to connection pad 63B. Note here that connection conductor 74B can be connected to connection pad 63B by, for example, pressure bonding.

Herein, connection conductor 74A and connection conductor 74B are generically called connection conductor 74. Furthermore, terminal 75A and terminal 75B are generically called terminal 75. Furthermore, connection wiring 82A and connection wiring 82B are generically called connection wiring 82. Note here that it is preferable that a width of wiring 56 is thinner than a width of connection conductor 74. Furthermore, it is preferable that a width of wiring 55 is thinner than the width of connection conductor 74. Connection conductor 74 can be formed by a screen printing method, an etching method using a photoresist, an additive method, or the like.

However, the formation method of connection conductor 74 is not limited to the above-mentioned methods. When conductor 61, linear conductor 62 and ground conductor 65 (see FIG. 5) are made of metal mesh, they need to be molded to have such a thin conductor width that they cannot be recognized visually. In this case, conductor 61, linear conductor 62, and ground conductor 65 can be molded to have a fine width by, for example, a nanoimprint method, and the like. Herein, wiring 55 and wiring 56 are preferably formed by the same method as for conductor 61, linear conductor 62, and ground conductor 65. With this configuration, widths of wiring 55 and wiring 56 can be made thin.

A transmitted signal is input into terminal row 73. Conductor 61 transmits the transmitted signal input from terminal row 73 to linear conductor 62. Then, the signal received by linear conductor 62 is output from terminal 75 to the outside. Note here that linear conductor 62 is not necessarily limited to a configuration of receiving the signal transmitted from conductor 61, but may have a configuration of transmitting the transmitted signal input from terminal 75 to conductor 61. In this case, conductor 61 receives the signal transmitted from linear conductor 62. Then, conductor 61 outputs the received signal to terminal row 73. In this case, the transmitted signal is input into terminal 75. Then, terminal row 73 outputs the received signal received by conductor 61.

As shown in FIG. 1, panel unit 21 is not necessarily limited to a configuration including cover lens 23 and adhesive layer 24, but may have a configuration in which cover lens 23 serves as base body 31. That is to say, in FIG. 1, panel unit 21 may not include cover lens 23. In this case, sensor conductor 51 is disposed facing liquid crystal display device 502. Furthermore, touch panel 503 is not necessarily limited to an out-cell type, but may be an on-cell type. In this case, a surface layer of liquid crystal display device 502 serves as base body 31. Furthermore, touch panel 503 is not necessarily limited to an out-cell type, but may be an in-cell type. In this case, a thin film transistor (TFT) array substrate of liquid crystal display device 502 may serve as base body 31.

Figure 5:
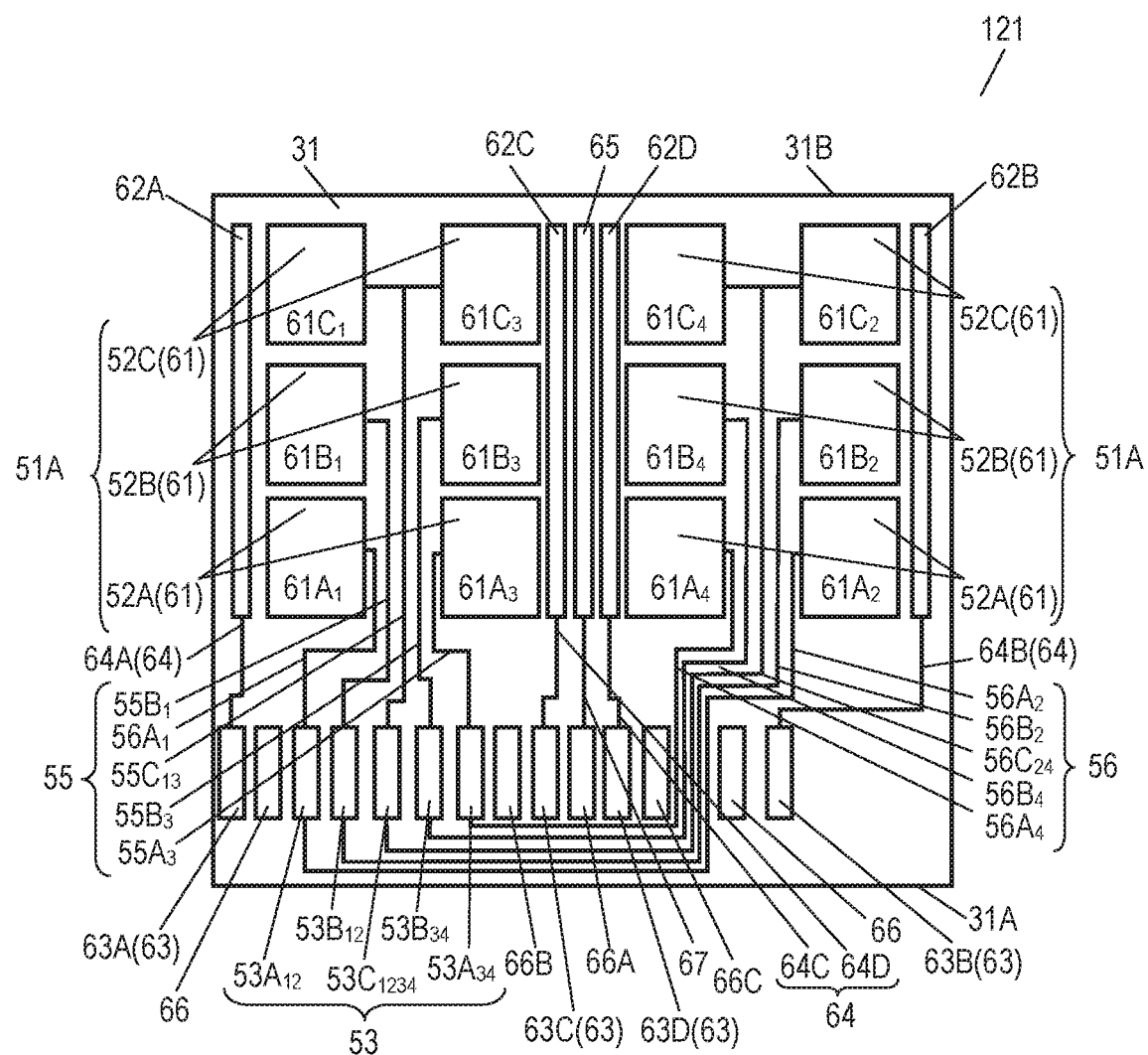
FIG. 5 is a front view of another panel unit in accordance with the exemplary embodiment.

FIG. 5 is a front view of another panel unit 121 in accordance with the exemplary embodiment. Panel unit 121 is different from panel unit 21 in that panel unit 121 includes conductor $61A_3$, conductor $61A_4$, conductor $61B_3$, conductor $61B_4$, conductor $61C_3$, and conductor $61C_4$. That is to say, conductor row 52A of panel unit 121 includes conductor $61A_1$, conductor $61A_2$, conductor $61A_3$, and conductor $61A_4$. Furthermore, conductor row 52B of panel unit 121 includes conductor $61B_1$, conductor $61B_2$, conductor $61B_3$, and conductor $61B_4$. Conductor row 52C of panel unit 121 includes conductor $61C_1$, conductor $61C_2$, conductor $61C_3$, and conductor $61C_4$. Therefore, panel unit 121 is different from panel unit 21 in that connection pad 53 of panel unit 121 further includes connection pad $53A_{34}$ and connection pad $53B_{34}$. Furthermore, panel unit 121 is different from panel unit 21 in that wiring 55 of panel unit 121 further includes wiring $55A_3$ and wiring $55B_3$. In addition, panel unit 121 is different from panel unit 21 in that wiring 56 of panel unit 121 further includes wiring $56A_4$ and wiring $56B_4$. That is to say, each of conductor row 52A, conductor row 52B, and conductor row 52C of panel unit 121 includes four conductors 61. Note here that the conductor row is not necessarily limited to have a configuration including four conductors 61, and may have a configuration including five or more conductors. Furthermore, when conductor $61A_1$, conductor $61B_1$, and conductor $61C_1$ are arranged in a tandem, panel unit 121 has a tandem including four conductors in the Y-axis direction. However, the number of rows of conductors is not necessarily limited to this and may include five or more rows.

In FIG. 5, conductor $61A_3$ and conductor $61A_4$ are disposed between conductor $61A_1$ and conductor $61A_2$. Furthermore, conductor $61B_3$ and conductor $61B_4$ are disposed between conductor $61B_1$ and conductor $61B_2$. In addition, conductor $61C_3$ and conductor $61C_4$ are disposed between conductor $61C_1$ and conductor $61C_2$. That is to say, conductor $61A_3$, conductor $61A_4$, conductor $61A_1$, and conductor $61A_2$ are arranged in a straight line in the X-axis direction. Furthermore, conductor $61B_3$, conductor $61B_4$, conductor $61B_1$, and conductor $61B_2$ are arranged in a straight line in the X-axis direction. Furthermore, conductor $61C_3$, conductor $61C_4$, conductor $61C_1$, conductor $61C_2$ are arranged in a straight line in the X-axis direction. Furthermore, conductor $61A_3$, conductor $61B_3$, and conductor $61C_3$ are arranged in a straight line in the Y-axis direction. Conductor $61A_4$, conductor $61B_4$, and conductor $61C_4$ are arranged in a straight line in the Y-axis direction.

In this case, connection pad $53A_{34}$ is preferably electrically connected to conductor $61A_3$ and conductor $61A_4$. Furthermore, connection pad $53B_{34}$ is preferably electrically connected to conductor $61B_3$ and conductor $61B_4$. Note here that panel unit 121 includes connection pad $53C_{1234}$ instead of connection pad $53C_{12}$ of panel unit 21. Connection pad $53C_{1234}$ is connected to conductor $61C_1$, conductor $61C_2$, conductor $61C_3$, and conductor $61C_4$. Therefore, panel unit 121 includes wiring $55C_{13}$ instead of wiring $55C_{12}$ of panel unit 21. Wiring $55C_{13}$ connects conductor $61C_1$ and conductor $61C_3$ to connection pad $53C_{1234}$. Panel unit 121 is different from panel unit 21 in that panel unit 121 further includes wiring $56C_{24}$. Wiring $56C_{24}$ connects conductor $61C_2$ and conductor $61C_4$ to connection pad $53C_{1234}$.

It is preferable that panel unit 121 further includes linear conductor 62C and linear conductor 62D. In this case, linear conductor 62C is disposed along one ends of conductor $61A_3$, conductor $61B_3$, and conductor $61C_3$. Meanwhile, linear conductor 62D is disposed along one end of each of conductor $61A_4$, conductor $61B_4$, and conductor $61C_4$. Note here that linear conductor 62A and linear conductor 62B are disposed in a straight line in a direction from first end 31A to second end 31B. That is to say, linear conductor 62A and linear conductor 62B are wired in the Y-axis direction. Furthermore, wiring 64 includes wiring 64C and wiring 64D. Linear conductor 62C is connected to connection pad 63C via wiring 64C. Linear conductor 62D is connected to wiring 63D via connection pad 64D. Connection pad 63C and connection pad 63D are disposed between connection pad $53A_{34}$ and connection pad 63B. Wiring 56 passes between connection pad 63D and connection pad 63B. Furthermore, wiring 56 passes between connection pads 63D and 63C and first end 31A.

Furthermore, it is preferable that ground conductor 65 is provided between linear conductor 62C and linear conductor 62D. In this case, ground conductor 65 is connected to connection pad 66A via ground wiring 67. That is to say, ground wiring 67 is wired in the direction from ground conductor 65 toward first end 31A. Ground wiring 67 is wired through between wiring 64C and wiring 64D. Connection pad 66A is disposed between connection pad 63C and connection pad 63D. Furthermore, wiring 56 passes between connection pad 66A and first end 31A. Note here that ground wiring 67 may not be wired in a direction from ground conductor 65 to first end 31A. For example, connection pad 66A may be disposed in the vicinity of second end 31B, and ground wiring 67 may be wired in the direction from ground conductor 65 toward second end 31B, thus connecting ground 65 and connection pad 66A to each other.

Furthermore, it is preferable that connection pad 66B is formed between connection pad 53 and connection pad 63C. Furthermore, it is preferable that connection pad 66C is formed between connection pad 63D and wiring 56. Connection pad 66B or connection pad 66C may not be connected to ground conductor 65 or ground wiring 67.

Figure 6:
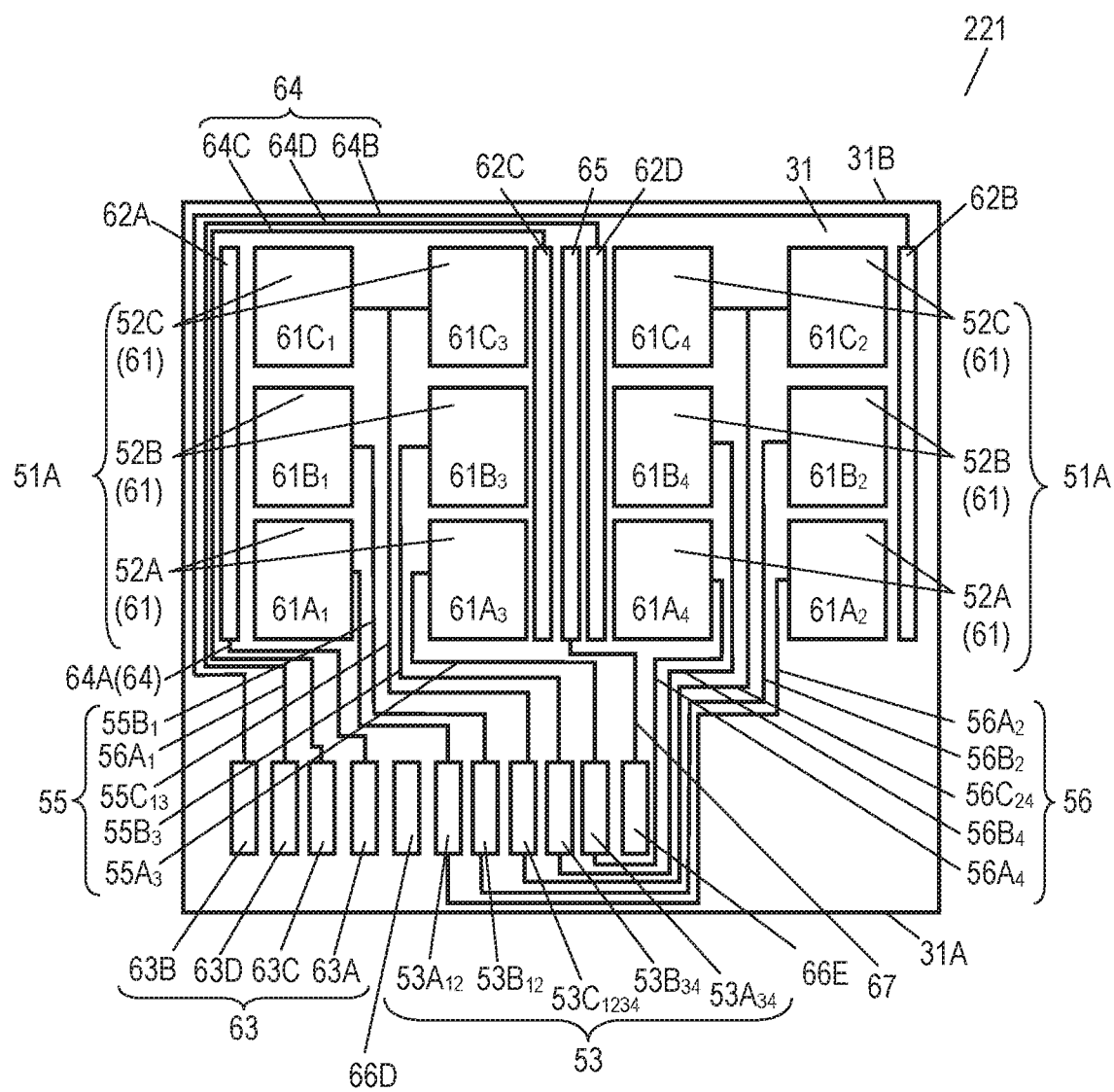
FIG. 6 is a front view of still another panel unit in accordance with the exemplary embodiment.

FIG. 6 is a front view of still another panel unit 221 in accordance with the exemplary embodiment. Panel unit 221 is different from panel unit 121 in a shape of wiring 64. Wiring 64B, wiring 64C, and wiring 64D pass between conductor row 52C and second end 31B and are connected to connection pad 63. In this case, connection pad 63 is disposed in a position nearer to a corner of base body 31 than connection pad 53. Furthermore, it is preferable that connection pad 63A and connection pad 53 are arranged. In this case, connection pad 63A is arranged in the X-axis direction with respect to connection pad 53. Then, connection pad 63 is disposed in the order of connection pads 63B, 63D, 63C, and 63A sequentially from the corner of base body 31.

Connection pad 66D of panel unit 221 is provided between connection pad 63A and connection pad $53A_{12}$.

Connection pad 66E is provided between connection pad 53A$_{34}$ and wiring 56A$_4$. With this configuration, connection pad 66 in panel unit 121 may not be disposed in panel unit 221. Consequently, panel unit 221 can be made smaller than panel unit 121.

Wiring 64 is wired along the row of conductor 61A$_1$, conductor 61B$_1$, and conductor 61C$_1$. That is to say, wiring 64 passes between linear conductor 62A and the outer peripheral end portion of base body 31. Note here that wiring 64 is not necessarily configured to pass through between linear conductor 62A and the outer peripheral end portion of base body 31. For example, wiring 64 may be wired along the row of conductor 61A$_2$, conductor 61B$_2$, and conductor 61C$_2$. In this case, wiring 64 passes between linear conductor 62B and the outer peripheral end portion of base body 31. Alternatively, wiring 64 may be divided and wired so as to pass between linear conductor 62A and the outer peripheral end portion of base body 31, and between linear conductor 62B and the outer peripheral end portion of base body 31.

As mentioned above, according to the present disclosure, a first wiring and a second wiring are provided extending from a first connection pad to the opposite side. That is to say, the first wiring is wired from the first connection pad toward a first conductor. On the other hand, the second wiring extends from the first connection pad toward a first end of a base body, and extends from the end portion along the first end, and from the end portion toward the second conductor. Since one first pad is connected to a plurality of conductors, the number of the first connection pads can be reduced. As a result, an area of a region in which the first connection pad is disposed can be reduced. Consequently, the panel unit can be reduced in size. Furthermore, the number of connection conductors in the connection unit can be reduced. Therefore, an area of a region in which the connection conductor is wired can be reduced. Consequently, a connection unit can be reduced in size. With the configuration mentioned above, a touch panel can be reduced in size.

INDUSTRIAL APPLICABILITY

A touch panel of the present disclosure has an advantageous effect of capable of being reduced in size, and is useful for input devices and the like that are used in various electronic apparatuses.

REFERENCE MARKS IN THE DRAWINGS 21 panel unit
22 connection unit
23 cover lens
24 adhesive layer
31 base body
31A first end
31B second end
51 sensor conductor
51A conductor group
52A conductor row
52B conductor row
52C conductor row
53 connection pad
53A$_{12}$, 53A$_{34}$ connection pad
53B$_{12}$, 53B$_{34}$ connection pad
53C$_{12}$, 53C$_{1234}$ connection pad
54 wiring group
55 wiring
55A$_1$, 55A$_3$ wiring
55B$_1$, 55B$_3$ wiring
55C$_{12}$, 55C$_{13}$ wiring
56 wiring
56A$_2$, 56A$_4$ wiring
56B$_2$, 56B$_4$ wiring
56C$_{24}$ wiring
61 conductor
61A$_1$, 61A$_2$, 61A$_3$, 61A$_4$ conductor
61B$_1$, 61B$_2$, 61B$_3$, 61B$_4$ conductor
61C$_1$, 61C$_2$, 61C$_3$, 61C$_4$ conductor
62 linear conductor
62A linear conductor
62B linear conductor
62C linear conductor
62D linear conductor
63 connection pad
63A connection pad
63B connection pad
63C connection pad
63D connection pad
64 wiring
64A wiring
64B wiring
64C wiring
64D wiring
65 ground conductor
66 connection pad
66A connection pad
66B connection pad
66C connection pad
66D connection pad
66E connection pad
67 ground wiring
71 base material
72 connection conductor row
72A connection conductor
73 terminal row
73A terminal
74, 74A, 74B connection conductor
75, 75A, 75B terminal
80 connection wiring
82, 82A, 82B connection wiring
91 line segment (first line segment)
92 line segment (second line segment)
93 line segment (third line segment)
94 line segment (fourth line segment)
101 first surface
102 second surface
201 first surface
202 second surface
121 panel unit
221 panel unit
501 display device
502 liquid crystal display device (LCDD)
503 touch panel

The invention claimed is:

1. A touch panel comprising a panel unit, the panel unit including:
a base body including a first end and a second end opposite to the first end;
a conductor row including:
a first conductor disposed on the base body, and
a second conductor disposed on the base body and in a first direction with respect to the first conductor;

a first connection pad disposed on the base body and between the conductor row and the first end of the base body;

a first wiring disposed on the base body and electrically connecting the first conductor to the first connection pad, the first wiring including a first line segment extending directly from the first connection pad toward the second end; and a second wiring disposed on the base body and electrically connecting the second conductor to the first connection pad, the second wiring including:

a second line segment extending directly from the first connection pad toward the first end, and a third line segment extending along the first end of the base body, wherein the first conductor is connected electrically to the second conductor via the first connection pad, and the first line segment, the second line segment, and the third line segment are straight line segments.

2. The touch panel of claim 1, wherein the second wiring further includes a fourth line segment extending along a direction from the first end toward the second end, the fourth line being a straight line segment.

3. The touch panel of claim 2, wherein the first line segment, the first connection pad, the second line segment, and the third line segment are connected to one another in this order along the first wiring, the first connection pad, the second wiring.

4. The touch panel of claim 1, wherein
the first connection pad is one of a plurality of first connection pads, and the plurality of first connection pads are arranged in the first direction, and
the conductor row is one of a plurality of conductor rows, and the plurality of conductor rows are arranged in a second direction orthogonal to the first direction.

5. The touch panel of claim 1, wherein the first direction is perpendicular to a direction along which a shortest distance between the first end and the second end of the base body is defined.

6. The touch panel of claim 1, wherein:
the first conductor has a first surface and a second surface opposite to the first surface of the first conductor, the first surface facing the second conductor, and
the panel unit further includes:
a first linear conductor disposed in a position facing the second surface of the first conductor;
a second connection pad disposed between the first linear conductor and the first end of the base body; and
a third wiring electrically connecting the first linear conductor to the second connection pad.

7. The touch panel of claim 6, wherein:
the second conductor has a first surface and a second surface opposite to the first surface of the second conductor, the first surface facing the first conductor, and
the panel unit further includes:
a second linear conductor disposed in a position facing the second surface of the second conductor;
a third connection pad disposed between the second linear conductor and the first end of the base body; and
a fourth wiring electrically connecting the second linear conductor to the third connection pad.

8. The touch panel of claim 1, further comprising a connection unit, the connection unit including:

a base material;
a first terminal disposed on the base material;
a first connection conductor disposed on the base material, and electrically connected to the first connection pad; and
a first connection wiring disposed on the base material, and electrically connecting the first connection conductor to the first terminal.

9. The touch panel of claim 8, wherein:
the first conductor has a first surface and a second surface opposite to the first surface of the first conductor, the first surface facing the second conductor, and
the panel unit further includes:
a first linear conductor disposed in a position facing the second surface of the first conductor;
a second connection pad disposed between the first linear conductor and the first end of the base body; and
a third wiring electrically connecting the first linear conductor to the second connection pad, and
the connection unit further includes:
a second terminal disposed on the base material;
a second connection conductor disposed on the base material, and electrically connected to the second connection pad; and
a second connection wiring electrically connecting the second connection conductor to the second terminal.

10. The touch panel of claim 9, wherein:
the second conductor has a first surface and a second surface opposite to the first surface of the second conductor, the first surface facing the first conductor,
the panel unit further includes:
a second linear conductor disposed in a position facing the second surface of the second conductor;
a third connection pad disposed between the second linear conductor and the first end of the base body; and
a fourth wiring electrically connecting the second linear conductor to the third connection pad, and
wherein the connection unit further includes:
a third terminal disposed on the base material;
a third connection conductor disposed on the base material, and electrically connected to the third connection pad; and
a third connection wiring electrically connecting the third connection conductor to the third terminal.

11. A display device comprising:
the touch panel of claim 1, and
a liquid crystal display device.

12. The display device of claim 11, wherein a surface layer of the liquid crystal display device serves as the base body.

13. The display device of claim 11, wherein a thin film transistor array substrate of the liquid crystal display device serves as the base body.

14. The touch panel of claim 1, wherein the first line segment, the first connection pad, the second line segment, and the third line segment are connected to one another in this order along the first wiring, the first connection pad, the second wiring.

15. The touch panel of claim 1, wherein
the second line segment of the second wiring is connected to the first connection pad at a connection point on the first connection pad, and
the third wiring is located between the connection point and the first end of the base body.

16. The touch panel of claim 1, wherein
the second line segment of the second wiring is connected to the first connection pad at a connection point on the first connection pad, and
the third wiring is connected to the second line segment at a position in a side of the connection point, the side of the connection point facing the first end of the base body.

\* \* \* \* \*